United States Patent [19]

Aspinwall

[11] 4,282,528

[45] Aug. 4, 1981

[54] PLURAL ANTENNAS HAVING A SLEEVE DIPOLE

[75] Inventor: John F. Aspinwall, Purley, England

[73] Assignee: Communications Patents Limited, London, England

[21] Appl. No.: 35,547

[22] Filed: May 3, 1979

[30] Foreign Application Priority Data

May 9, 1978 [GB] United Kingdom ............... 18580/78

[51] Int. Cl.[3] .............................................. G06F 3/14

[52] U.S. Cl. .................................... 343/727; 343/792

[58] Field of Search ............... 343/727, 756, 784, 770, 343/792

[56] References Cited

U.S. PATENT DOCUMENTS

| | | | |
|---|---|---|---|
| 2,954,556 | 9/1960 | Yang | 343/727 |
| 3,879,735 | 4/1975 | Campell et al. | 343/792 |

FOREIGN PATENT DOCUMENTS

| | | | |
|---|---|---|---|
| 1466279 | 3/1969 | Fed. Rep. of Germany | 343/727 |
| 1184610 | 3/1970 | France . | |
| 445968 | 4/1936 | United Kingdom . | |
| 453484 | 9/1936 | United Kingdom . | |
| 462571 | 3/1937 | United Kingdom . | |
| 644521 | 10/1950 | United Kingdom . | |

*Primary Examiner*—David K. Moore

*Attorney, Agent, or Firm*—Laurence R. Brown

[57] ABSTRACT

An antenna arrangement comprising a first antenna mounted on an elongate support, and a feeder cable incorporating screened and screening conductors extending longitudinally of the support from the first antenna. The screened conductor is connected to a detector of signals in a first frequency band received by the first antenna, and the screening conductor forms a second antenna connected to a detector of signals in at least one further frequency band. The first antenna may be in the form of a sleeve dipole. The support may be in the form of a tube of non-conducting material in which the first antenna is located towards one end, the feeder cable extending through the tube from the first antenna to the end of the tube remote from the first antenna.

9 Claims, 5 Drawing Figures

PLURAL ANTENNAS HAVING A SLEEVE DIPOLE

The present invention relates to antenna arrangements and in particular to antenna for receiving signals in more than one frequency band.

There are several different types of radio navigation aids which are normally carried on board ships. These are the Omega system operating around 10–13 kHz, the Loran C and Decca systems operating around 80–110 kHz, the MF beacons operating from lighthouses and lightships at frequencies around 300 kHz, and the Satnav system which operates at 400 MHz. Traditionally each aid has had a separate receiver fed from its own aerial.

Ships are fitted with a large number of radio devices each requiring its own antenna, and the positioning of these antennas one relative to another is a very difficult task since, being in close proximity, they tend to interact with each other and so cause irregularities in their polar diagrams. In addition their proximity can also cause large unwanted signals to be induced into receiving equipment fed from one antenna when transmitting equipment is operating into another antenna.

Clearly any means of reducing the number of antenna required on a ship would be advantageous since the task of finding suitable locations for them would be reduced and the performance of the remainder less likely to be compromised. Accordingly it is an object of the present invention to provide a single antenna arrangement which is capable of feeding signals to receivers for all the navigation aids mentioned above, so replacing the four presently required.

According to the present invention, there is provided an antenna arrangement comprising a first antenna mounted on an elongate support, and a feeder cable incorporating screened and screening conductors extending longitudinally of the support from the first antenna, the screened conductor being connected to means for detecting signals in a first frequency band received by the first antenna, and the screening conductor forming a second antenna connected to means for detecting signals in at least one further frequency band received by the screening conductor.

The invention also provides a method for receiving signals in at least two frequency bands using a single antenna arrangement, wherein signals in a first frequency band are received by an antenna mounted on an elongate support and the received signals are conveyed to a first detecting means via a screened conductor of a feeder cable, and signals in at least one further frequency band are received by a screening conductor of the feeder cable and conveyed via the screening cable to a further detecting means.

Preferably, the first antenna comprises a sleeve dipole, and the support comprises a tube of non-conducting material in which the first antenna is located towards one end thereof, the feeder cable extending through the tube from the first antenna to the end of the tube remote from the first antenna. The screening conductor is connected to a source of fixed potential by a circuit presenting a low impedance to signals in said first frequency band and a high impedance to signals in said at least one further frequency band.

An embodiment of the present invention will now be described, by way of example, with reference to the accompanying drawings, in which.

Figure 1:
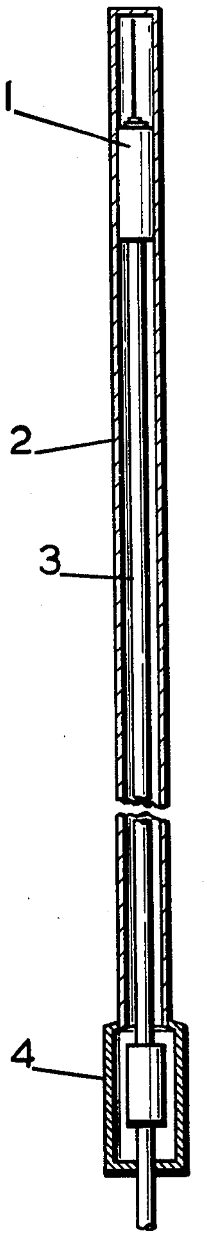
FIG. 1 is a schematic cut-away diagram of an antenna arrangement embodying the present invention.

Referring to FIG. 1, the illustrated antenna arrangement comprises a first antenna in the form of a sleeve dipole 1 resonant at the Satnay frequency of 400 MHz mounted within and near the top of a fiberglass tube 2 about six feet in length. A feeder cable 3 extends from the dipole 1 down the tube 2 to a mounting assembly 4 in which filter and pre-amplifier circuits are enclosed. The dipole is arranged to function at 400 MHz in a conventional manner.

The feeding cable 3 comprises an inner screened conductor and an outer screening conductor which is employed as a second antenna in the form of an aperiodic whip for receiving LF/MF frequencies such as the aforesaid frequency ranges of 10–13 kHz and/or 300 kHz and/or 80–110 kHz. This outer screening conductor may be formed in any convenient manner, for example by a solid metallic tube, wrapped metal strip or woven wire braid.

Figure 2:
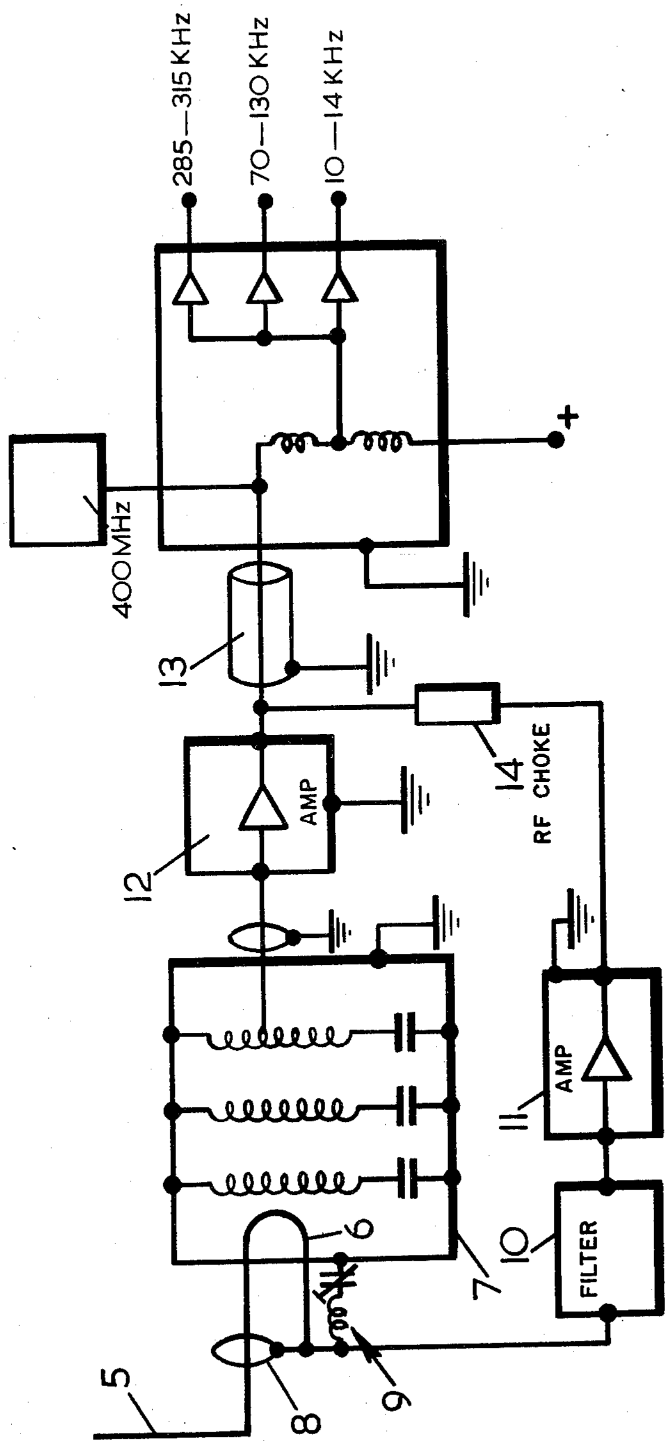
FIG. 2 is a schematic circuit diagram of an antenna arrangement according to the present invention.

FIG. 2 shows the electrical circuitry in the mounting assembly. The screened conductor 5 of the feeder 3 is coupled to an input loop 6 of a three-section band pass filter 7 having a pass band centered at 400 MHz. The outer screening conductor 8 of the feeder 3 is not however connected to earth in the normal manner. It is earthed only for frequencies in the vicinity of 400 MHz through a series resonant circuit 9. The outer conductor 8 is therefore 'live' at LF/MF frequencies and is connected via filter circuit 10 to the input of an LF/MF pre-amplifier 11. The 400 MHz signals are also applied to a pre-amplifier 12 after passing through the filter 7. The outputs of the two pre-amplifiers 11, 12 are both applied to a single cable 13 from which signals are taken away from the base 4 (FIG. 1) of the antenna. The output path of the LF/MF pre-amplifier 11 is blocked to signals at 400 MHz by means of an RF choke 14 whilst the output circuit of the 400 MHz pre-amplifier 12 is arranged to have a high impedance in the LF/MF range. DC power for the pre-amplifiers 11 and 12 is applied over the inner conductor of the cable 13.

Figure 3:
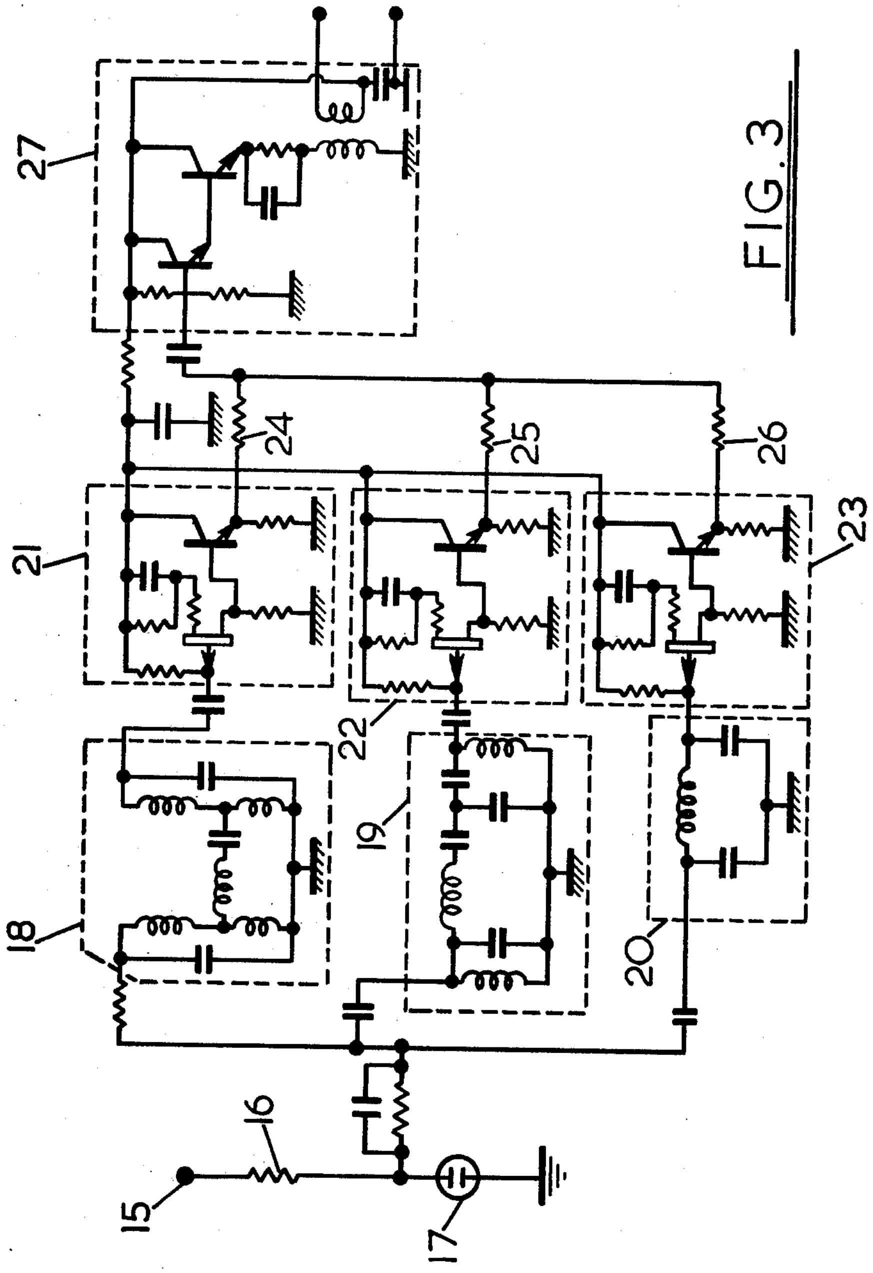
FIG. 3 is a detailed circuit diagram of filter and pre-amplifier circuit shown schematically in FIG. 2.

The circuit of the LF/MF filter and pre-amplifier circuits 10, 11 is shown in FIG. 3. The conductor 8 of the feeder cable 3 is connected to input 15 in series with a high wattage resistor 16 the amplifier end of which is shunted to ground by a gas discharge tube 17. This combination serves to protect the pre-amplifier against lightning discharges and signals from high powered transmitters which might be located nearby. This protection arrangement is followed by three parallel filters 18, 19 and 20 each arranged to pass a respective one of the three frequency ranges over which the pre-amplifier is required to operate. These filters are followed by individual amplifiers 21, 22 and 23 having a similar configuration although the degree of amplification of each is different so as to equalise the level of output signals in each frequency range. The outputs of the amplifiers are combined through resistors 24, 25 and 26 and then applied to a common punching amplifier 27 from which signals are passed to the cable 13 (FIG. 2).

Figure 4:
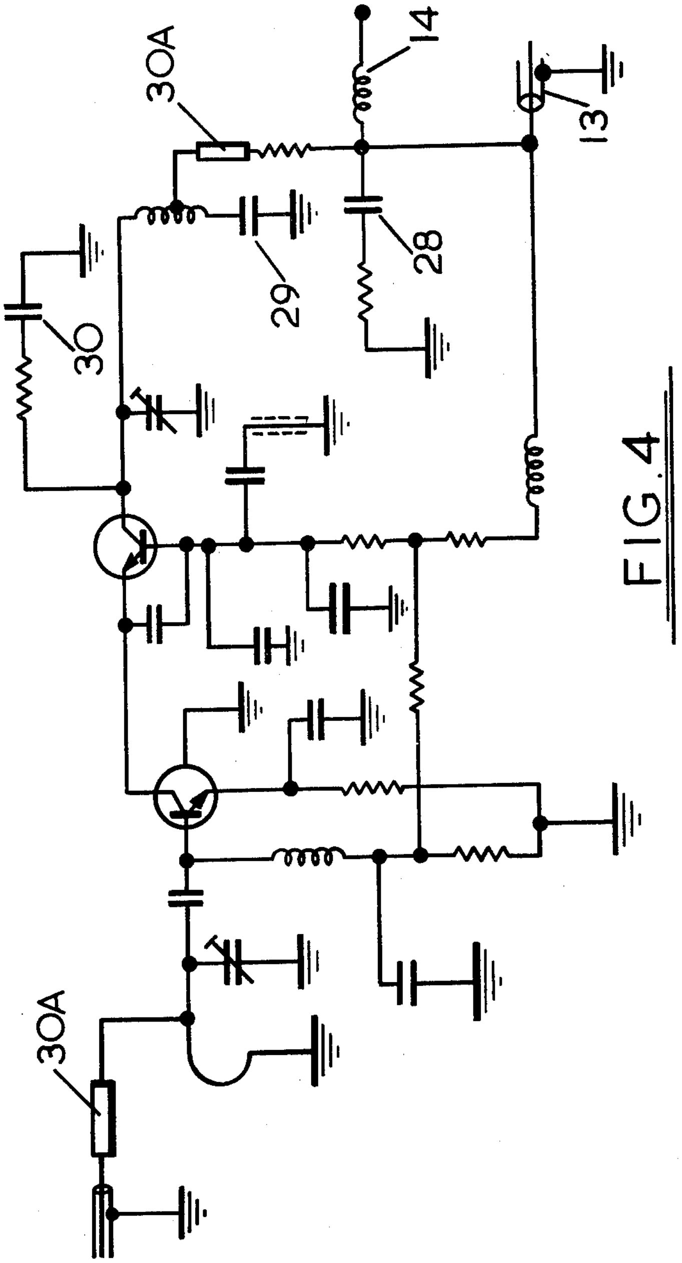
FIG. 4 is a detailed circuit diagram of a further pre-amplifier circuit shown schematically in FIG. 2.

The 400 MHz pre-amplifier 12 of FIG. 2 is shown in detail in FIG. 4 and comprises a conventional low noise cascode arrangement. By-pass capacitors 28, 29 and 30 associated with its output circuit are made low in value so that while its output impedance at 400 MHz is of the order of 50 ohms its output impedance in the LF/MF range is sufficiently high to give a negligible shunting effect to the signals from the other preamplifier 11 (FIG. 2). The choke 14 of FIG. 2 is identified in FIG. 4 also. Conductive strips 30A provide low value inductances for impedance matching.

Figure 5:
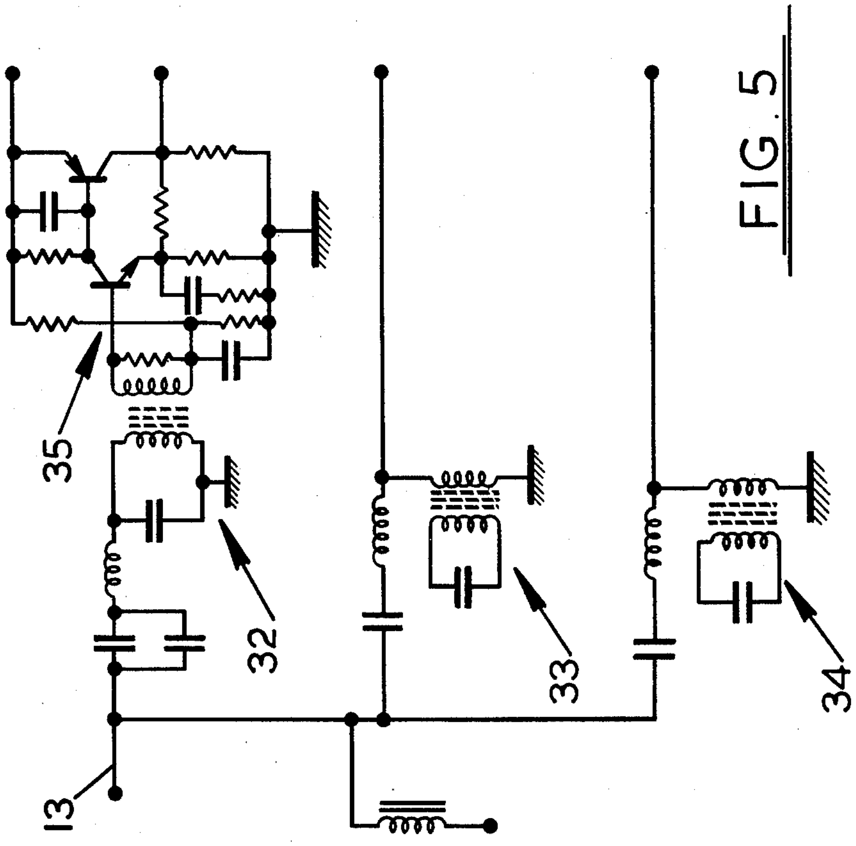
FIG. 5 is a detailed circuit diagram of a splitter circuit shown schematically in FIG. 2.

The far end of the cable 13 (FIG. 2) terminates at a suitable location such as the navigator's office. The received signals are applied to a splitter 31 shown diagrammatically in FIG. 2 and in more detail in FIG. 5. The splitter 31 comprises three relatively simple filters indicated generally by numerals 32, 33 and 34 to provide frequency separation. A small degree of further amplification is applied to the Omega signals between 10 and 14 kHz by circuit 35. The reason for this further amplification is that in more complex, especially military, installations two or more Omega receivers each receiving a different frequency are provided in order to minimise the ambiguity errors which can arise with this system if a single frequency only is received. The extra amplification allows the Omega receivers to be fed through for example a further resistive splitter (not shown).

What is claimed is:

1. A dual frequency band antenna arrangement with a single lead cable comprising in combination, a first antenna consisting of a vertically disposed sleeve dipole antenna having an electrical length related to the wavelength of a first higher frequency band mounted on an elongate support, a mounting assembly for said support, and a feeder cable incorporating screened and screening conductors and consisting of said single lead cable extending longitudinally of the support from the first antenna to the mounting assembly and having a vertically disposed dimension providing an aperiodic whip antenna for a second lower frequency band, the screened conductor being connected within said mounting assembly to means for processing signals in said first higher frequency band received by the first antenna, the screening conductor forming a second antenna connected to the means processing signals in the first band within said mounting assembly by filter means grounding that conductor only for the frequency band of the first band and further connected within said mounting means to means for processing signals in at least said second lower frequency band received by the screening conductor as an ungrounded vertically disposed antenna member for the lower frequency band.

2. An antenna arrangement according to claim 1, wherein the first antenna comprises a sleeve dipole.

3. An antenna arrangement according to claim 1, wherein the support comprises a tube of non-conducting material in which the first antenna is located towards one end thereof, the feeder cable extending through the tube from the first antenna to the end of the tube remote from the first antenna.

4. An antenna arrangement according to claim 1, wherein the screening conductor is connected to a source of fixed potential by a circuit presenting a low impedance to signals in said first frequency band and a high impedance to signals in said at least one further frequency band.

5. An antenna arrangement according to claim 4, wherein said circuit comprises a series resonant circuit.

6. An antenna arrangement according to claim 1, wherein the screened and screening conductors are connected to respective band pass filter circuits to process respectively the two frequency bands.

7. An antenna arrangement according to claim 6, wherein the outputs of the filter circuits are connected via preamplification circuits to a common signal path.

8. An antenna arrangement according to claim 7, wherein the pre-amplification circuits are powered via the common signal path.

9. An antenna arrangement according to claim 7, wherein the common signal path is connected to receivers in respect of each said frequency band by a splitter circuit located adjacent the receivers.

* * * * *